United States Patent [19]
Bormann et al.

[11] Patent Number: 6,157,378
[45] Date of Patent: Dec. 5, 2000

[54] METHOD AND APPARATUS FOR PROVIDING A GRAPHICAL USER INTERFACE FOR A DISTRIBUTED SWITCH HAVING MULTIPLE OPERATORS

[75] Inventors: Richard J. Bormann, Howell, N.J.; Ann C. Fulop, Bloomington, Ill.; Steven J. Shute, Yardley, Pa.; Radakichenane Vengatatry, Edison; Phillip A. Weeks, Little Silver, both of N.J.

[73] Assignee: AT&T Corp., New York, N.Y.

[21] Appl. No.: 09/109,214

[22] Filed: Jun. 30, 1998

Related U.S. Application Data
[60] Provisional application No. 60/051,568, Jul. 2, 1997.

[51] Int. Cl.[7] .................................................. G06F 13/00
[52] U.S. Cl. ......................... 345/329; 709/223; 345/969
[58] Field of Search .................................. 345/326, 329, 345/331, 969, 333, 356, 340; 709/223, 225, 224, 201, 220

[56] References Cited

U.S. PATENT DOCUMENTS

| | | | |
|---|---|---|---|
| 5,285,494 | 2/1994 | Sprechter et al. ........................ | 379/59 |
| 5,606,664 | 2/1997 | Brown et al. ........................ | 395/200.1 |
| 5,627,964 | 5/1997 | Reynolds et al. ........................ | 395/183 |
| 5,627,978 | 5/1997 | Altom et al. ........................ | 395/330 |
| 5,655,077 | 8/1997 | Jones et al. ........................ | 713/201 |
| 5,671,354 | 9/1997 | Ito et al. ........................ | 713/201 |
| 5,848,243 | 12/1998 | Kulkarni et al. ........................ | 709/224 |
| 5,958,010 | 9/1999 | Agarwal et al. ........................ | 709/224 |
| 5,990,892 | 11/1999 | Urbain ........................ | 345/356 |
| 5,991,807 | 11/1999 | Schmidt et al. ........................ | 709/225 |

OTHER PUBLICATIONS

IBM Technical Disclosure Bulletin, Graphical User Interface for Managing Nodes in a Distrbuted System, vol. 34, No. 9, pp. 160–162, Feb. 1992.

IEEE, Implementing Interactive Configuration Management for Distributed System, 1996.

IBM Technical Disclosure Bulletin, "Graphical User Interface for the Distributed Computing Environment", vol. 38, No. 1, pp. 409–410, Jan. 1995.

IBM Technical Disclosure Bulletin, "Parallel Processor Architecture to Control Multiple Independent Telecommunications Switching Nodes", vol. 28, No. 8, pp. 3272–3273, Jan. 1986.

Who(1) UNIX System V (Sep. 23, 1987), printed Jan. 14, 1998.

*Primary Examiner*—Raymond J. Bayerl
*Assistant Examiner*—Tadesse Hailu

[57] ABSTRACT

A graphical user interface (GUI) for a distributed switch is provided to a user; a set of operators being logged into the distributed switch. The set of operators can include a human operator and an automated system. A set of operator identifiers associated with the set of operators and login information associated with each operator identifier is received. The set of operator identifiers and their associated login information is displayed through the graphical user interface. A user response associated with a first operator identifier from the set of operator identifiers is received through the graphical user interface. A login state of a first operator from the set of operators is modified; the first operator is associated with the first operator identifier from the set of operator identifiers based on the received user response.

12 Claims, 3 Drawing Sheets

FIG. 3

| Login ID | User Name | WorkGroupID | Access Class | Activity | Processor(s) | Contact Info |
|---|---|---|---|---|---|---|
| OSlogID | ANSWER | NCC East | 04 | SW Update | DAP Cluster | 800-555-6666 |
| UserlogID | John Smith | SPP OSWF | 03 | Reboot | SIP2 | 800-555-4444 |
| UserlogID | Jane Smith | NESAC | 02 | Test | CP5 | 800-555-7878 |

[Log Off] [Allow logins] [Prohibit Logins] [Cancel]

METHOD AND APPARATUS FOR PROVIDING A GRAPHICAL USER INTERFACE FOR A DISTRIBUTED SWITCH HAVING MULTIPLE OPERATORS

CROSS-REFERENCE TO A RELATED PATENT APPLICATIONS

This patent application claims the benefit of U.S. Provisional Application No. 60/051,568 entitled *Graphical User Interfaces and Reusable Java Components For Use With A Distributed Platform Switch,* filed on Jul. 2, 1997 pending and is incorporated herein by reference.

This patent application is related to commonly assigned U.S. Patent applications entitled, *A Method And Apparatus For Using A Graphical User Interface (GUI) As the Interface To A Distributed Platform Switch,* Ser. No. 08/985,862, filed Dec. 5, 1997, *A Method and Apparatus for Supervising a Distributed Platform Switch Through Graphical Representations,* Ser. No. 08/985,866, filed Dec. 5, 1997, *A Method And Apparatus For Supervising A Processor Within A Distributed Platform Switch Through Graphical Representations,* Ser. No. 08/986,220, filed Dec. 5, 1997, *Reusable Software Components For A Graphical User Interface For A Distributed Network Switch,* Ser. No. 08/985,775, filed Dec. 5, 1997, *A Reusable Light-Emitting Diode (LED) Canvas Software Component For A Graphical User Interface,* Ser. No. 08/986,219, filed Dec. 5, 1997, *A Reusable Sparing Cell Software Component For A Graphical User Interface,* Ser. No. 08/986,218, filed Dec. 5, 1997, and *A Reusable Reversible Progress Indicator Software Component For A Graphical User Interface,* Ser. No. 08/985,865, filed Dec. 5, 1997, with the same inventors and is incorporated herein by reference.

This patent application is related to commonly assigned U.S. Patent applications entitled, *A Method and Apparatus for Displaying Status Information and Selecting Maintenance Activities for Connections within a Distributed Switch,* and *A Method and Apparatus for Providing Customized Access to Data Associated with Measures for Processors within a Distributed Switch* filed by the same inventors and are incorporated herein by reference.

BACKGROUND OF THE INVENTION

The present invention generally relates to the field of distributed computing and the field of telecommunications. Specifically, the present invention relates to providing a graphical user interface (GUI) for a distributed switch having multiple operators.

Traditional nondistributed network switches are maintained by maintenance technicians remotely located. Typically, multiple maintenance technicians can interact simultaneously with a single switch to perform maintenance activities in parallel. Multiple maintenance technicians performing maintenance simultaneously of course gives rise to potential interference between the maintenance technicians. Consequently, coordination among maintenance technicians is required; this coordination tracks what maintenance is scheduled in the nondistributed switch and what non-maintenance activities are occurring in the switch during the scheduled maintenance.

In addition, coordination and communication between remote maintenance technicians and local maintenance technicians may be required. A remote maintenance technician may need to call a local technician to go to the switch to perform physical equipment replacements. The local technician may not be familiar with the equipment and the remote technician needs to talk through the maintenance procedures with the local technician.

Moreover, because many individuals can log into and interact with a traditional nondistributed network switch, the processing load imposed on the switch often increases as more and more individuals interact with the switch. The non-maintenance related activities can interfere with some maintenance activities, such as rebooting the software utilized by the switch. Furthermore, as a switch requires maintenance, the likelihood increases that more and more individuals, particularly individuals not related to maintenance, will interact with the switch to, for example, monitor the switch's performance.

Known methods for monitoring individuals logged into a computer system are limited to text commands which provide cryptic character-based output. For example, the UNIX "who" command displays a list of an individual's login name, terminal name and login time. The UNIX "who" command also can store to a file all logins, logouts, reboots and crashes since the file was created. Special characters are used to indicate certain activities; for example, the character "~" is used to in place of a device name to indicate a reboot has occurred for that device.

Known methods for monitoring individuals logged into a computer system suffer several shortcomings. An individual's login name, terminal name and login time are displayed in a cryptic format with alphanumeric codes generally unintelligible to the untrained maintenance technician. The maintenance technician typically uses a manual to translate the displayed codes into useful information which is typically limited to specifying the activity being performed on a specific processor. Moreover, for a maintenance technician to logout users and initiate maintenance activities, the maintenance technician must perform multiple steps requiring manual input of character-based commands with particular syntax, options and parameters. The maintenance technician is susceptible to making errors in translating the displayed codes or manually entering character-based commands.

Furthermore, known methods for monitoring individuals logged into a computer system cannot provide information on computer operating systems performing, for example, automated tasks on the computer. For example, the UNIX "who" command only displays information on human individuals logged into the computer system, but displays no information on operating systems that may be performing automated maintenance activities on the switch.

The problems associated with multiple maintenance technicians and multiple non-maintenance individuals interacting with traditional nondistributed network switches are exacerbated in the environment of distributed network switches each having multiple interconnected processors. In this distributed network switch environment, additional maintenance technicians may be required, additional individuals may interact with the various distributed processors, and additional coordination between technicians and individuals interacting with the distributed switch likely may be needed. Furthermore, a distributed network switch can have multiple operating systems performing automated tasks on the processor(s) within the distributed switch.

SUMMARY OF THE INVENTION

A graphical user interface (GUI) for a distributed switch is provided to a user; a set of operators being logged into the distributed switch. The set of operators can include a human operator and an automated system. A set of operator identifiers associated with the set of operators and login information associated with each operator identifier is received. The set of operator identifiers and their associated login information is displayed through the graphical user interface. A user response associated with a first operator identifier from the set of operator identifiers is received through the graphical user interface. A login state of a first operator from the set of operators is modified; the first operator is associated with the first operator identifier from the set of operator identifiers based on the received user response.

BRIEF DESCRIPTION OF THE DRAWINGS

FIG. 3 illustrates an example of a secondary GUI screen showing information about operators logged into the distributed switch, according to an embodiment of the present invention.

DETAILED DESCRIPTION

Figure 1:
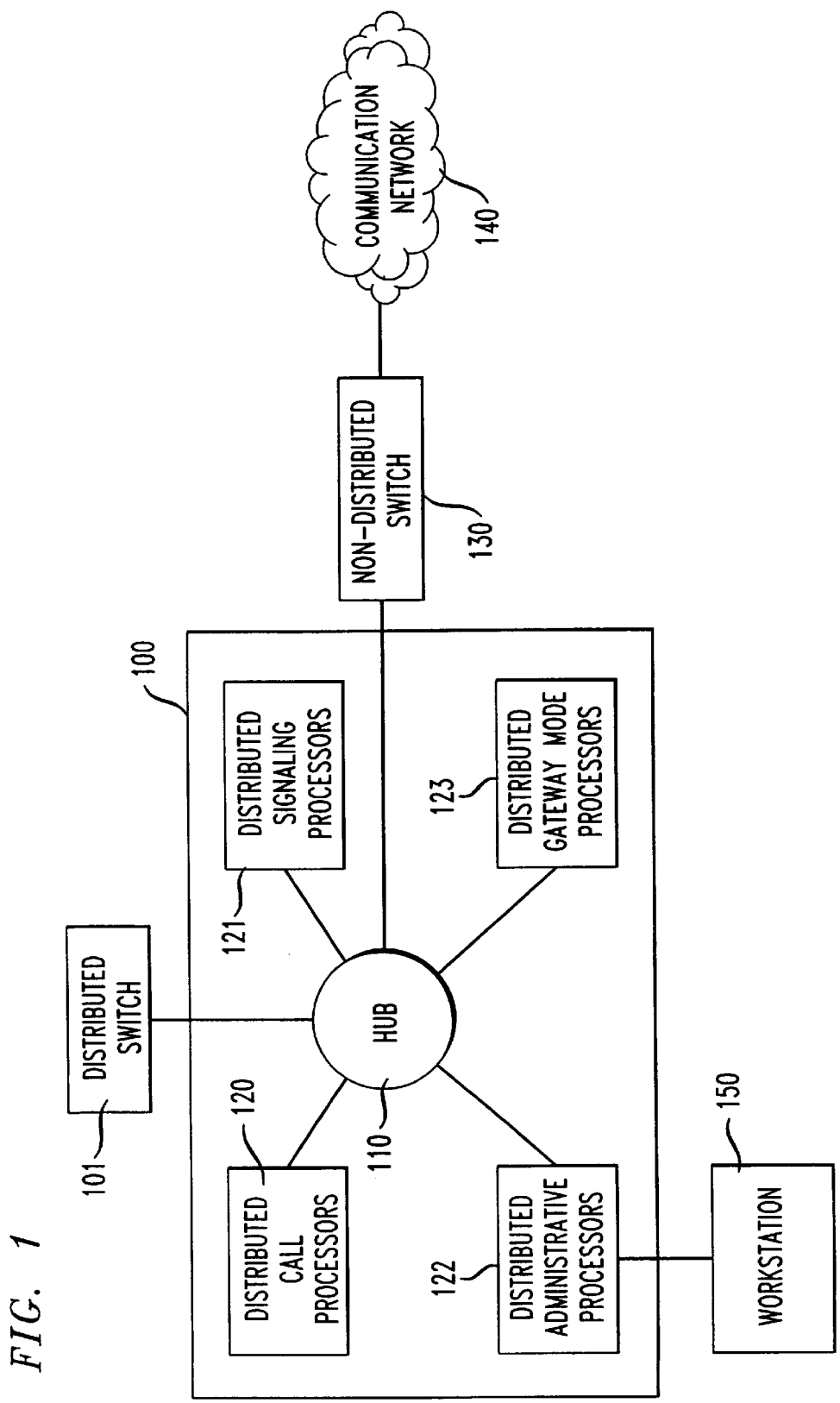
FIG. 1 shows a network of distributed processors that can be supervised through the GUI, according to an embodiment of the present invention.

A graphical user interface (GUI) for a distributed switch used by a set of operators is provided. A set of operator identifiers and login information associated with the operators are received. These operator identifiers and login information are displayed through the GUI. A user response associated with an operator identifier is received through the GUI. The login state of the operator associated with the operator identifier is modified based on the received user response.

The term "operators" is used herein to include, but is not limited to, human operators and computer operating systems that are interacting with a particular processor(s) within the distributed switch. Human operators include, for example, human maintenance technicians interacting with particular processor(s) within the distributed switch to perform maintenance on the switch. Human operators also can include, for example, system managers monitoring the performance and utilization of the distributed switch. Computer operating systems can include, for example, any type of automated computer software which initiates interactions with processors within the distributed switch.

The term "operator identifier" is used herein to include, but is not limited to, information by which an operator can be identified and which can be displayed to a user (e.g., a maintenance technician) through the GUI. The operator identifier (also referred to herein as "operator identifier information" can include, for example, an operator's login identification, user name, group identification, access class and contact information.

The term "login state" is used herein to include, but is not limited to, information about an operator logging into the distributed switch. The login state can include, for example, information on whether the operator is currently logged in to a processor(s) within the distributed switch, prohibited from logging into a processor(s) within the distributed switch, or allowed to log into a processor(s) within the distributed switch.

The term "login information" is used herein to include, but is not limited to, information about an operator's activities within the distributed switch. Unlike "login state" which refers to the status of an operator being logged currently, allowed to login prospectively or prohibited from login prospectively, "login information" relates to information about the operator's interaction within the distributed switch (e.g., performing a test, rebooting a processor or updating a software); and about affected processor(s) within the distributed switch.

User responses can be received through the GUI from, for example, the maintenance technician responding to the selections displayed through the GUI. The term "user responses" is used herein to include, but is not limited to, information received from the maintenance technician using the GUI through an input device. User responses can be in the form of, for example, keystrokes from a keyboard or mouse clicks associated with displayed option buttons, list boxes, combination boxes or command buttons.

FIG. 1 shows a network of distributed processors that can be supervised through the GUI, according to an embodiment of the present invention. The commonly assigned patent application entitled A METHOD AND APPARATUS FOR USING A GRAPHICAL USER INTERFACE (GUI) AS THE INTERFACE TO A DISTRIBUTED PLATFORM SWITCH, Ser. No. 08/985,862, filed Dec. 5, 1997, provides a description of the exemplary system configuration of the distributed switch shown in FIG. 1 and is incorporated by reference herein.

Distributed switch 100 comprises hub 110, distributed call processors 120, distributed signaling processors 121, distributed administrative processors 122, and distributed gateway node processors 123. Hub 110 connects distributed processors 120 through 123. Hub 110 also can connect distributed switch 100 to non-distributed switch 130 or can connect directly to communication network 140. Non-distributed switch 130 is connected to communications network 140, or directly can connect to communication network 140. Distributed switch 100 can also be connected to another distributed switch, such as distributed switch 101. Workstation 150 is connected to one administrative processor from distributed administrative processors 122. Alternatively, workstation 150 can be connected to hub 110.

Although FIG. 1 shows one particular configuration of distributed switch 100, other configurations are possible. For example, although FIG. 1 shows the functionality of distributed switch 100 divided into various groups, the functionality can be divided into other arrangements. Although distributed switch 100 is shown in FIG. 1 as being distributed using a hub configuration, other configurations, such as ring or star configurations, are possible.

Similarly, although FIG. 1 shows certain interconnections between distributed switch 100, non-distributed switch 130 and communications network 140, other interconnections are possible. For example, distributed switch 100 can be connected to other distributed switches not shown.

Hub 110 is a device interconnecting distributed processors 120 through 123. Hub 110 provides internal messaging capabilities for distributed switch 100. In other words, hub 110 determines how internal messages are routed to distributed processors 120 through 123 and controls the timing related to the processing of those internal messages. Hub 110 can be, for example, an asynchronous transfer mode (ATM) switch such as the Enterprise Hub by Xyplex Networks. Hub 110 can cooperate with a redundant back-up system referred herein as a maintenance alternate access (MAA) (not shown). The MAA can interconnect distributed processors 120 through 123 through RS232 and/or Ethernet connections to provide higher reliability than is possible only with a hub using ATM connections. The connections between distributed processors 120 through 123 are discussed more fully below in reference to FIGS. 2 through 7.

Distributed processors 120 through 123 each comprise a set of processors performing specialized functions. More specifically, distributed call processors 120 perform call processing; distributed signaling processors 121 perform CSS7 (Common Channel Signaling System 7) signaling; distributed administrative processors 122 perform administrative functions such as logging events and performing alarm intelligence; and distributed gateway node processors 123 connect switch 100 to adjunct platforms such as, for example, a billing system. Distributed call processors 120 can include, for example, three to twelve call processors; distributed signal processors can include, for example, two to six signal processors; distributed administrative processors can include, for example, two to six administrative processors.

Distributed processors 120 through 123 can be fault-tolerant, discrete-event processors, such as those manufactured by Tandem Computers, Inc. or Stratus Computer, Inc. Each processor in distributed processors 120 through 123 can comprise a central processing unit (CPU), computer-readable memory, a network port and a data bus connecting the CPU, computer-readable memory and the network port.

Workstation 150 comprises a processor, a computer-readable memory, an input port to be coupled to an input device such as a keyboard, an output port to be coupled to an output device such as a monitor, a switch port to be coupled to distributed switch processor 120, and a databus. The databus can connect the processor, the computer-readable memory, the input port, the output port and the switch port. Workstation 150 can be, for example, any computer that can run instructions programmed in the Java™ programming language by Sun Microsystems, Inc.® and includes a Java Virtual Machine (JVM). Consequently, when workstation 150 having the JVM downloads instructions, the instructions can be interpreted into machine code specific to workstation 150. For example, workstation 150 can be a personal computer or the SPARCstation™ 4 workstation by Sun Microsystems.

Workstation 150 runs appropriate software, such as a WEB browser like Netscape Navigator® by Netscape Communications Corp., Hot Java™ by Sun Microsystems, or a separate program like Sun Microsystems *appletviewer* or other JAVA-compatible software. For example, workstation 150 can use Netscape Navigator to receive and operate Java applets.

Workstation 150 can receive data through the switch port from an administrative processor in distributed administrative processors 122. The data received by workstation 150 can include data used to construct a GUI and can include state information indicating the state of the distributed switch components and the state of the connections between the distributed switch components. The state information can, for example, include status information and/or alarm information about the distributed switch components and their connections.

The data used by workstation 150 to construct the GUI can be, for example, Java applets downloaded from an administrative processor in distributed administrative processors 122. The Java applets can be programs that perform the drawing functions and provide graphical objects with which a user can interact.

The GUI can be any type of graphic-based interface such as a window-type display containing graphic elements that represent various elements of the distributed switch. For example, each processor from distributed switch processors 120 through 123, hub 110 and their respective interconnections can be represented by a graphic element with the GUI. The GUI can also be integrated within a multimedia presentation including audio, text, and animation.

Figure 2:
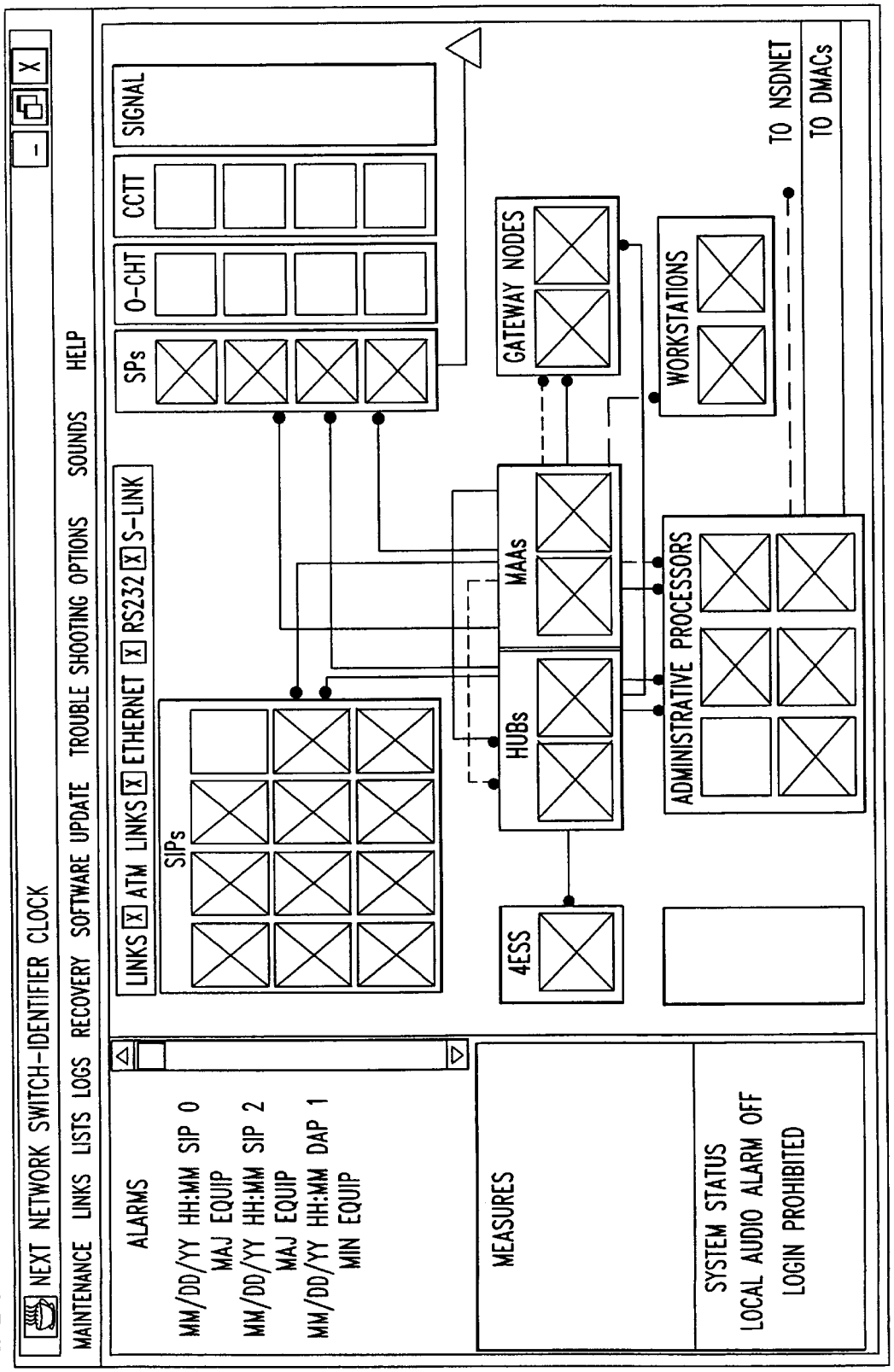
FIG. 2 illustrates an example of a GUI screen showing state information about the connections within a distributed switch, according to an embodiment of the present invention.

FIG. 2 illustrates an example of a GUI screen showing state information about the connections within a distributed switch, according to an embodiment of the present invention. The commonly assigned patent application entitled A METHOD AND APPARATUS FOR SUPERVISING A DISTRIBUTED PLATFORM SWITCH THROUGH GRAPHICAL REPRESENTATIONS, Ser. No. 08/985,866, filed Dec. 5, 1997, provides a description of the graphical user interface for supervising a distributed switch and is incorporated by reference herein.

FIG. 2 shows a main window of a graphical user interface (GUI) showing state information about the elements within a distributed switch, according to an embodiment of the present invention. State information can include alarm information, status information, operational information and administrative information.

The graphic section of the main window can show graphic representations of the switch elements. Specifically, each switch element including the distributed-switch processors and their interconnections can be represented by a glyph, i.e., a picture-based representation which conveys meaning to the observer. Each glyph representing a switch element can provide several types of state information.

FIG. 3 illustrates an example of a secondary GUI screen showing information about operators logged into the distributed switch, according to an embodiment of the present invention. The information about each operator logged into the distributed switch can include: operator identifier information, login information and a login state. This information can displayed in a list box within the secondary GUI screen.

In the example shown in FIG. 3, the operator identifier information includes the following: Login ID, User Name, WorkGroupID, Access Class, and Contact Info. The Login ID indicates the login name recognized by the distributed switch; the User Name indicates the actual name of the logged in operator in a form which a maintenance technician can easily understand. The WorkGroupID indicates the group into which operators can be aggregated based on, for example, functionality or geographical location of the operator. The Access Class indicates the level of access and the types of interaction allowed for the particular operator. The Contact Info. provides information which a GUI user can utilize to contact a logged in operator. This contact information can be in the form of, for example, a telephone number or an electronic-mail address.

In the example shown in FIG. 3, the login information includes the following: Activity and Processor(s). The Activity indicates the particular interaction occurring within the distributed switch and initiated by the operator. The Processor(s) indicates the particular distributed-switch component(s) affected by the interaction initiated by the operator; the affected distributed-switch component(s) can include, for example, a particular processor within the distributed switch, a functional cluster of processors within the distributed switch, the entire distributed switch itself, or a connection (i.e., a link or path) interconnecting processors within the distributed switch.

Finally, in the example shown in FIG. 3, the login state can include information on whether an operator is logged in to a processor(s), prohibited from logging into a processor (s), or allowed to log into a processor(s). At least a portion of the login state information can be displayed in the secondary GUI screen: when an operator is logged into a processor(s) of the distributed switch, a row of information for that operator is displayed within the list box; when an operator is logged out of the distributed switch, a row of information for that operator is either removed from or not displayed in the list box. An option button labeled "Log Off" can provide a maintenance technician having the required access class permission an option to log off a particular operator from the distributed switch.

Note that this window can show operating systems logged into the switch. For example, the first line of FIG. 3 shows operator identifier information, login information and a login state for an operator which is an operating system; this operating system has a User Name of ANSWER and is performing the activity of a software update ("SW Update").

In one embodiment of the present invention, all additional operators can be allowed or prohibited from logging into the distributed switch in the future through the use of the option buttons labeled "Allow Logins" and "Prohibit Logins", respectively. Correspondingly, when future operators are allowed to log into the distributed switch, the "Allow Logins" option button is not enabled and the "Prohibit Logins" option button is enabled. When future operators are not allowed to log into the distributed switch, the "Prohibit Logins" option button is not enabled and the "Allow Logins" option button is enabled.

When logins have been prohibited and the distributed switch is rebooted, the default can be reset for allowing logins so that operators can again login into the distributed switch; this prevents all operators being logged out during the reboot and then prohibited from logging in after the reboot.

When logins have been prohibited, the main window can provide the maintenance technician with this information. As shown in the example of the main window in FIG. 2, the window labeled "System Status" can indicate when logins have been prohibited. As shown in FIG. 2 where logins have been prohibited, the "System Status" window indicates: "Logins Prohibited".

In another embodiment of the present invention, each operator can be allowed or prohibited individually from logging into a specific processor(s). In this embodiment, when the "Allow Logins" option button or "Prohibit Logins" option button is selected by a maintenance technician, a list box can be displayed showing a list of all processors within the distributed switch or a list of the processor into which the operator is logged, respectively. The maintenance technician can then select a specific processor(s) which an operator can be allowed to log into or can be prohibited from logging into.

Because operator identifier information, login information and login state information can be correlated within a single GUI screen, a maintenance technician thereby can coordinate operators interacting with the distributed switch. For example, when a particular maintenance activity is required for a given processor(s) within the distributed switch, the maintenance technician can determine which operators are logged into the given processor(s), log out that operator if necessary and also prohibit any operator from logging into that processor until the maintenance activity is complete. Because the operator's name and contact information is correlated with the login identification, the maintenance technician can, for example, call the operator to assess their activity and/or request the operator to log out voluntarily of a particular processor(s) if needed for various maintenance activities to be performed.

It should, of course, be understood that while the present invention has been described in reference to particular system components and GUI configurations, other system configurations and GUI configurations should be apparent to those of ordinary skill in the art. For example, although specific operator identifier information, login information, and login state information are shown in the examples of the secondary GUI window, different types of information can be displayed. For example, the secondary GUI window can provide such information as operator-provided estimated time to complete interaction with a processor(s).

What is claimed is:

1. A method for providing to a user a graphical user interface for a distributed switch, used by a plurality of operators being longed into the distributed switch, the method, comprising:

(a) receiving a plurality of operator identifiers associated with the plurality of operators and login information associated with each operator identifier, the plurality of operators including a human user and an automated system;

(b) displaying, through the graphical user interface, the plurality of operator identifiers and their associated login information;

(c) receiving, through the graphical user interface, a user response associated with a first operator identifier from the plurality of operator identifiers; and (d) modifying a login state of a first operator from the plurality of operators, the first operator being associated with the first operator identifier from the plurality of operator identifiers based on the user response received in said step (c).

2. The method of claim 1, wherein:

the user response received in said receiving step (c) is a log off response associated with the first operator identifier from the plurality of operator identifiers; and the login state of the first operator is modified in said modifying step (d) so that the first operator is logged out of the distributed processor switch.

3. The method of claim 1, wherein:

the user response received in said receiving step (c) is a login prohibit response associated with the first operator identifier from the plurality of operator identifiers; and the login state of the first operator is modified in said modifying step (d) so that the first operator is prohibited from logging into the distributed processor switch.

4. The method of claim 1, wherein:

the user response received in said receiving step (c) is a login enable response associated with the first operator identifier from the plurality of operator identifiers; and the login state of the first operator is modified in said modifying step (d) so that the first operator is enabled to log into the distributed processor switch.

5. The method of claim 1, wherein said displaying step (b) is updated as a second operator from the plurality of operators logs out from the distributed processor switch.

6. The method of claim 1, wherein said displaying step (b) is updated as a second operator logs into the distributed processor switch.

7. An article of manufacture, comprising:

a computer-readable memory having stored thereon a plurality of instructions for providing to a user a graphical user interface for a distributed processor switch a plurality of operators being logged into the distributed switch, the instructions, when executed by a processor, cause the processor to:

(a) receive a plurality of operator identifiers associated with the plurality of operators and login information associated with each operator identifier, the plurality of operators including a human operator and an automated system;

(b) display, through the graphical user interface, the plurality of operator identifiers and its associated login information;

(c) receive, through the graphical user interface, a user response associated with a first operator identifier from the plurality of operator identifiers; and (d) modify a login state of a first operator from the plurality of operators, the first operator being associated with the first operator identifier from the plurality of operator identifiers based on the user received response.

8. The article of manufacture of claim 7, wherein:

the received user response is a log off indicator associated with the first operator identifier from the plurality of operator identifiers; and the login state of the first operator is modified so that the first operator is logged out of the distributed processor switch.

9. The article of manufacture of claim 7, wherein:

the received user response is a login prohibit response associated with the first operator identifier from the plurality of operator identifiers; and the login state of the first operator is modified so that the first operator is prohibited from logging into the distributed processor switch.

10. The article of manufacture of claim 7, wherein:

the received user response is a login enable response associated with the first operator identifier from the plurality of operator identifiers; and the login state of the first operator is modified so that the first operator is enabled to log into the distributed processor switch.

11. The article of manufacture of claim 7, wherein the display instruction further causes the processor to update the graphical user interface as a second operator from the plurality of operators logs out from the distributed processor switch.

12. The article of manufacture of claim 7, wherein the display instruction further causes the processor to is update the graphical user interface as a second operator logs into the distributed processor switch.

* * * * *